United States Patent Office 3,454,828
Patented July 8, 1969

3,454,828
PHOTOIONIZATION DETECTOR FOR GASES AND VAPORS
Mikiya Yamane, Tokyo-to, Japan, assignor to Kabushiki Kaisha Hitachi Seisakusho, Marunouchi, Chiyoda-ku, Tokyo-to, Japan, a joint-stock company of Japan
Continuation-in-part of application Ser. No. 318,284, Oct. 23, 1963. This application July 21, 1966, Ser. No. 566,866
Claims priority, application Japan, Oct. 24, 1962, 37/46,362; Mar. 29, 1963, 38/20,661, 38/14,137
U.S. Cl. 315—111          2 Claims

ABSTRACT OF THE DISCLOSURE

A photoionization detector for gases and vapors wherein a discharge chamber and a sensing chamber are connected by a metal conductor tube or a metal disk provided with a small aperture.

---

This application is a continuation-in-part of prior application Ser. No. 318,284, filed on Oct. 23, 1963, and now abandoned, in the name of Mikiya Yamane, and entitled, "Photoionization Detector for Gases and Vapors."

This invention relates to an apparatus for detecting and measuring gases and vapors of low concentrations. More particularly, the invention relates to a photoionization detector of a particular kind, in which radiation generated by an electrical discharge in a gas atmosphere is irradiated to a specimen in the form of gases and vapours (such gases and vapours are hereinafter referred to as "sample gas") existing in a carrier gas, whereby the sample gas is ionized and then it is detected by measuring the resulting ionization current.

The ionization voltages of the molecules of many gases and vapors are within the range of 9 to 15 ev., and, consequently, the radiation for ionizing these gases and vapors must be ultraviolet radiation having an energy higher than this ionization potential range. It is well known that ultraviolet rays having such energy are obtainable from an electrical discharge in a gas such as helium, argon, or hydrogen (for example: Tanaka, Y., Journal of the Optical Society of America, 48 (1958) 304).

In order to devise a new gas detector on the basis of the above-stated principle, the following problems must be solved.

(1) A material allowing ultraviolet rays having an energy of 9 to 15 ev. to pass through does not exist at present. Accordingly, the discharge for emitting these ultraviolet rays must be excited within the detector.

(2) This discharge must be stable. Since the characteristics of the discharge have a close relationship to the kind and nature of the gas, it is necessary that the discharge is excited within a constant atmosphere of a gas. Therefore, it is necessary to separate the discharge completely from the sample gas atmosphere.

(3) It is well known that, from the discharge, not only radiation but charged particles such as ions and electrons are given off. A portion of these charged particles flow to the sensing electrode and become a background current. The fluctuation of this background current is a factor determining the limits of detection and, in an ideal detector, its value should become zero. Accordingly, it is necessary to suppress the flow to the sensing electrode of charged particles given off by the discharge.

It is a prime object of the present invention to overcome the above-described difficulties and to provide a practical photoionization gas detector.

It is another object to provide a photoionization gas detector which has high stability and sensitivity, and which can be easily handled and adjusted.

The nature, principle, and details of the invention, as well as the manner in which the foregoing objects, other objects, and advantages of the invention may best be achieved, will be most fully understood by reference to the following detailed description of a preferred embodiment of the invention, taken in conjunction with the accompanying drawings, in which like parts are designated by like reference numerals, and in which.

Figure 1:
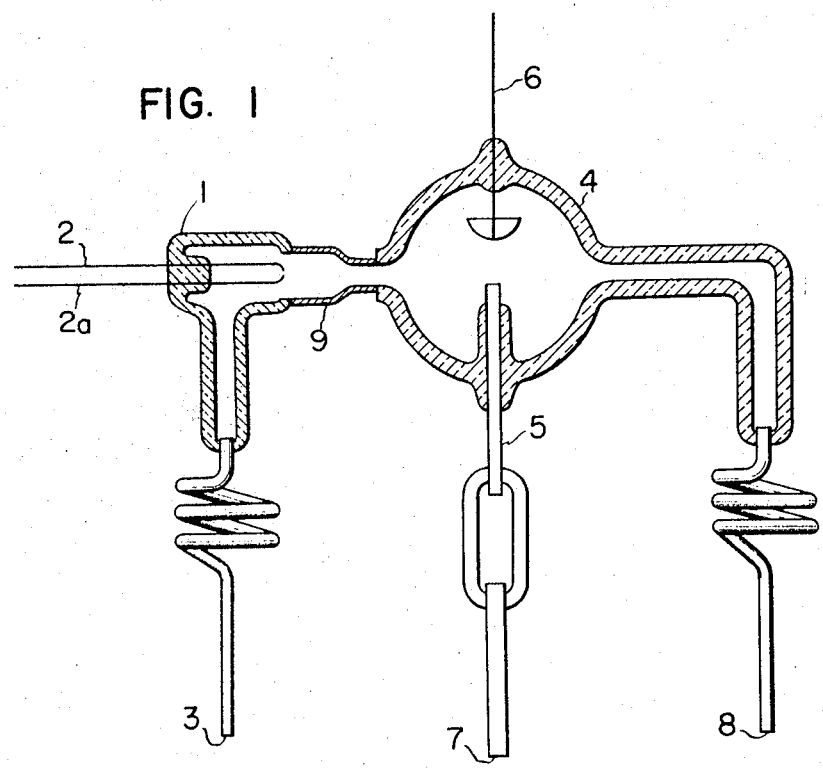
FIG. 1 is an elevational view, in vertical section, showing a preferred embodiment of the photoionization gas detector according to the invention.

Referring first to FIG. 1, the detector shown therein has a structure made principally of glass and has at its discharge section a discharge chamber 1 provided therein with discharge electrodes 2 and 2a made of two metal wires and an inlet 3 for the discharge gas. Since pure discharge gas (principally helium, argon, or hydrogen) is supplied through this inlet 3, the discharge accomplished by the electrodes 2 and 2a is constantly maintained in a stable manner in a pure gas, whereby ultraviolet rays of constant intensity are emitted.

The discharge chamber 1 is connected at its outlet side by a metal pipe such as, for example, a Kovar pipe 9 to an inlet of a sensing chamber 4, in which a tube-shaped anode 5 and a cathode 6 are provided. The outer end of the anode 5 is connected to an inlet 7 for the carrier gas which carries the sample gas. The sensing chamber 4 is provided at its outlet side with a common outlet 8 for the discharge and carrier gases.

When an inlet 3 for the discharge gas in the discharge chamber 1 and an inlet 7 for the carrier gas which carries the sample gas is subjected to and ionized by the ultra- the discharge chamber, it is not suitable for introducing discharge gas from the discharge chamber into the sensing chamber without flow of the carrier gas into the discharge chamber from the sensing chamber. On account of this, these inlets should not be disposed in parallel with the longitudinal axis of the discharge chamber.

During the operation of the above-described detector, the sample gas, carried by the carrier gas, is supplied through the inlet 7 and through the hollow interior of the anode 5 and flows into the sensing chamber 4, where the sample gas is subjected to and ionized by the ultraviolet radiation emitted from the discharge between the electrodes 2 and 2a in the discharge chamber 1. The ions so produced are collected at the cathode 6, and the resulting ionization current is measured. During this operation, the discharge gas flows from the discharge chamber 1 toward the sensing chamber 4, where it joins and becomes confluent with the carrier gas (including the sample gases) and the confluent gas mixture then is sent out through the common outlet 8.

The flow of charged particles from the discharge chamber 1 to the sensing chamber 4 is substantially suppressed by electrically grounding the aforementioned Kovar pipe 9 or by applying thereto a suitable voltage, thereby allowing only radiation rays to pass between the said chambers 1 and 4. Thus, the charged particles having different polarity from that of the voltage to be impressed on the Kovar pipe remain in the Kovar pipe, and the charged particles, having the same polarity as the voltage to be impressed on the Kovar pipe, are introduced into the sensing chamber from the discharge chamber. Furthermore, this pipe 9 is made to have a small bore, whereby the flow velocity of the discharge gas is increased within this pipe. This constructional feature has been found to be highly effective in preventing counterflow of the sample gas from the sensing chamber 4 toward the discharge chamber 1.

Figure 2:
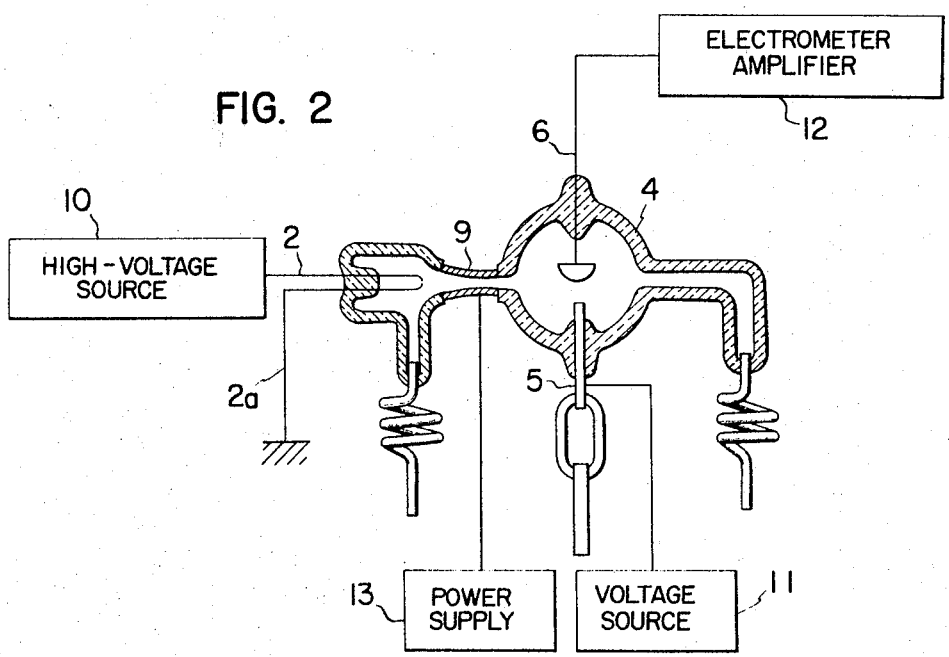
FIG. 2 is a block diagram of the detector circuit of the detector shown in FIG. 1, the ionization current of the sample gas being measured by this detector circuit.

To operate the above-described detector, it is connected in accordance with the circuit shown in FIG. 2. Specifically, the discharge electrode 2 is connected to a high voltage source 10, and the other electrode 2a is grounded. The discharge is caused to take place between these two electrodes. The anode 5 in the sensing chamber 4 is connected to a voltage source 11, and cathode 6 is connected to an electrometer amplifier 12 and is used for measurement of the ionization current of the sample gas. The pipe 9 is connected to a power supply source 13 applying a suitable voltage.

The characteristics of the detector when it is operated by means of the above-described circuit will now be considered. The discharge occurring between the electrodes 2 and 2a has a close relationship to the construction of and distance between these electrodes. As one example, the relationship between the discharge starting voltage and the gap distance between the electrodes for the case wherein helium is used for the discharge gas, and discharge is produced between the ends of the electrodes 2 and 2a, each made of 0.4 mm. diameter metal wire, is indicated graphically in FIG. 3. As can be observed in this graph, the discharge starting voltage increases with increase in electrode gap distance. When argon is used for the discharge gas, the discharge starting voltage is slightly higher than that in the case of helium under the same conditions, but the tendency of variation is the same as that indicated in FIG. 3. The stability of the discharge is interrelated also with the discharge current, and it has been found that in the case when the above-mentioned metal wire is used, the discharge becomes stable with a discharge current of 20 microamperes or higher in a stream of helium gas or with a discharge current of 100 microamperes or higher in a stream of argon gas.

When the same kind of gas is used for the discharge gas and for the carrier gas, the flow of the charged particles produced by the discharge into the sensing chamber 4 is suppressed by the pipe 9, and, moreover, the carrier gas, itself, is not ionized by the radiation emitted from the discharge. Therefore, the background current measured at the cathode 6 should be zero from consideration of the principle involved. The following example of actual measurement is of noteworthy significance.

Figure 4:
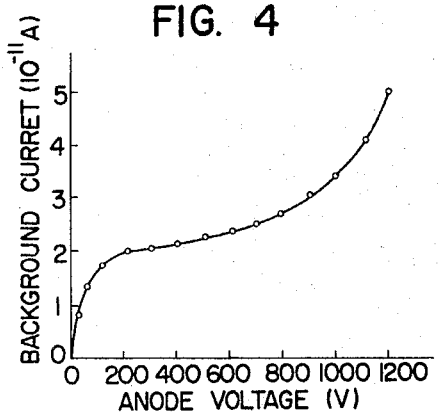
FIG. 4 is a graphical representation of one characteristic of the detector of the invention and indicates the relationship between the background current and the anode voltage.

60 cc./min. of argon as the carrier gas and 60 cc./min. of argon gas as the discharge gas were supplied through their respective inlets into a detector of the aforedescribed construction. The discharge current was maintained at 150 microamperes, and the pipe 9 was grounded. The relationship between the background current measured under these conditions and the anode voltage is indicated in FIG. 4. This current value is indicated as being a saturated value of approximately $2 \times 10^{-11}$ ampere up to an anode voltage of 800 volts. This tendency is thought to be due to photoionization and resulting measurement of impurity gases contained within the carirer gas. When, under such conditions, $4.5 \times 10^{-6}$ gram of propane gas was introduced as a sample gas into the carrier gas, the propane was photoionized, and a current of $1.2 \times 10^{-9}$ ampere was produced with an anode voltage of 200 volts. The ionization potential of propane is 11.2 ev., whereby the propane is amply ionized by the radiation emitted from the discharge in the argon.

It should be mentioned that when the pipe 9 does not exist, that is, in the case when the discharge chamber 1 and the sensing chamber 4 are connected by a glass tube, the background current is of the order of approximately $10^{-9}$ ampere. Consequently, under these conditions, the charged particles produced by the discharge flow into the sensing chamber, and most of the charged particles thereby imparting undesirable characteristics to the detector.

Figure 5:
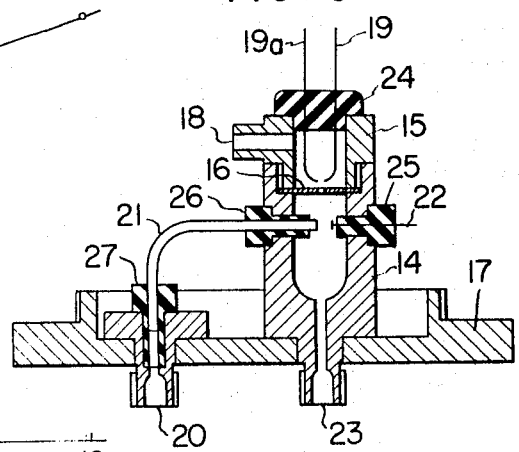
FIG. 5 is an elevational view, in vertical section, showing a modification of the detector shown in FIG. 1.

The photoionization gas detector shown in FIG. 5 is one example of an improved modification of the detector shown in FIG. 1. In the detector of FIG. 5, the sample gas is carried by a carrier gas and enters directly into the sensing chamber, and, furthermore, the discharge gas is caused to flow first into the discharge chamber and then into sensing chamber to flow confluently into the carrier gas. Means are further provided so that mainly the radiation rays emitted from the discharge irradiate the sensing chamber, and most of the charged particles produced by the discharge are intercepted at an intermediate point and thereby prevented from flowing into the sensing chamber. In addition, means are provided to constrict the flow path of the discharge gas between the discharge chamber and the sensing chamber so as to increase the flow velocity thereof and prevent counterflow of the sample gas from the sensing chamber toward the discharge chamber.

The detector of the invention as illustrated by the modified embodiment shown in FIG. 5 will now be described in greater detail. The principal structure of this detector is a combination of a metal sensing chamber 14 mounted at its outlet end on a base 17 and a metal discharge chamber 15 connected adjacently to and coaxially with the sensing chamber 14. A metal diaphragm disk 16 having a small central hole is interposed between and is in direct contact with the chambers 14 and 15. The discharge chamber 15 is provided with a discharge gas inlet 18 and two discharge electrodes 19 and 19a made of metal wire. The sensing chamber 14 is provided with a detector cathode 22 and a tubular detector anode 21 disposed in mutually confronting positions with the gap therebetween disposed substantially on the centerline of the sensing chamber 14. The anode 21 serves also as an inlet flow path for the carrier gas and is connected at its outer end to a carrier gas inlet 20, which is mounted on the base 17. The outlet end of the sensing chamber 14 is connected to a gas outlet 23. The electrical conductors, that is, the electrodes 19 and 19a, the cathode 22, and the anode 21 are electrically insulated from the metal structural parts by insulating terminal plugs 24, 25, and 26 and 27, respectively.

In the operation of the detector of the above-described construction, the discharge chamber 15 is filled with pure discharge gas flowing hereinto through the discharge gas inlet 18, and discharge is caused to take place between the tips of the electrodes 19 and 19a. The discharge gas passes through the small hole in the disk 16 and flows into the sensing chamber 14, and, at the same time, the radiation emitted from the discharge also passes through the said small hole and irradiates the interior of the sensing chamber 14. However, since this disk 16 is made of metal and, moreover, is in direct contact with the principal metallic structure, and its potential therefore is zero, almost all of the charged particles produced by the discharge are captured at this disk 16.

The sample gas, carried by the carrier gas, passes through the carrier gas inlet 20 and the tubular anode 21 and enters the sensing chamber 14. The sample gas which has so entered the sensing chamber 14 is irradiated by the radiation emitted from the discharge and is photoionized. The resulting ions collect at the cathode 22, and the current so produced is measured. The discharge gas and the carrier gas in the sensing chamber are exhausted through the outlet 23.

In this detector of the above-described construction, the diaphragm disk 16, which partitions the sensing chamber 15, functions as an electrode which suppresses the flow into the sensing chamber 14 of most of the charged particles produced by the discharge. At the same time, this disk 16 constricts, by means of the small hole provided in its center, the flow of discharge gas into the sensing chamber, thereby increasing the velocity of this flow of discharge gas and thereby contributing greatly to the prevention of counterflow of the sample gas from the sensing chamber 14 toward the discharge chamber 15.

Figure 6:
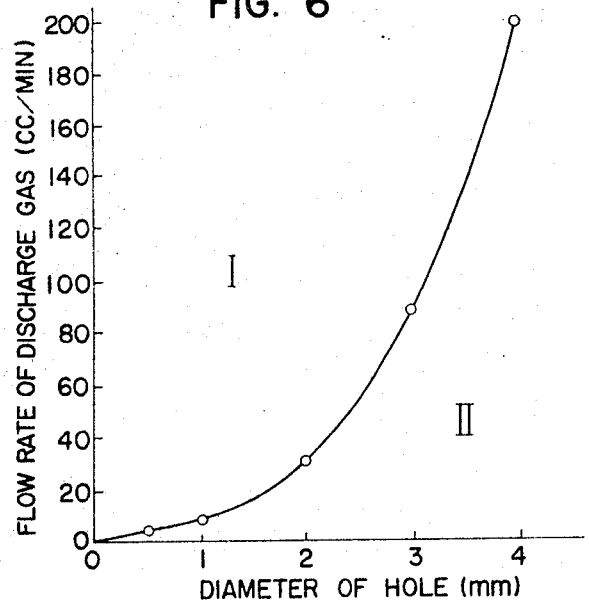
FIG. 6 is a graphical representation indicating the stable region of the discharge and indicating one advantageous effect of the invention.

An example of the effectiveness of the small hole in the diaphragm disk 16 is indicated graphically in FIG. 6, which is based on experimental results. The curve shown in FIG. 6, which is plotted with the diameter of the hole in the disk as the abscissa and the flowrate of the discharge gas as ordinate, indicates the boundary between a region I wherein, when a sample gas is introduced, the discharge is stably maintained and a region II wherein the discharge becomes unstable because of the introduction of the sample gas. This curve is the result of measurements made with argon used for the carrier gas flowrate of 30 cc./min., a discharge current of 150 microamperes, and 0.05 cc. of propane as the sample gas.

This experimental result indicates that, for maintaining the discharge in a stable manner when a sample gas is introduced, the smaller the hole diameter, the more advantageous it is. For example, with a hole diameter of 0.5 mm., the discharge is stable for a discharge gas flowrate of 5 cc./min. or higher, and with a hole diameter of 3 mm., a flowrate of 90 cc./min. or higher is capable of maintaining stable discharge, while with a hole diameter of 4 mm., a flowrate of 200 cc./min. or higher is required for stable discharge. If this counterflow prevention measure, that is, the measure of constricting the gas flow path between the discharge chamber and the sensing chamber, is not resorted to, the stability of the discharge cannot be secured unless the discharge gas is caused to flow at a flowrate of several hundreds of cc./min. The carrier gas flowrate employed in gas chramatography is ordinarily of several tens of cc./min. Consequently, discharge gas flowing at a flowrate of several hundreds of cc./min. would greatly dilute the sample gas within the sensing chamber, thereby lowering the sensitivity of the detector.

As will be observed from this point, the constriction of the gas flow path between the discharge chamber and the sensing chamber has an extremely high effectiveness.

Figure 3:
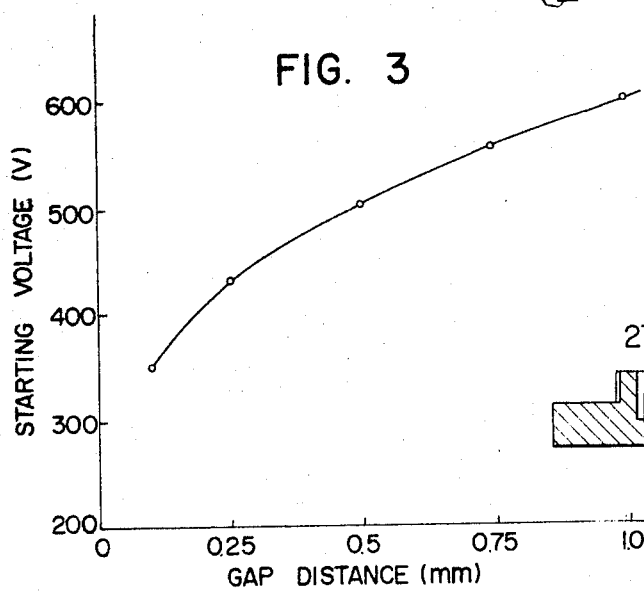
FIG. 3 is a graphical representation of one example of the discharge characteristic of a detector radiation source and indicates the relationship between the electrode gap distance and the discharge starting voltage in the case wherein discharge is caused to occur at the tips of a pair of 0.4 mm. diameter metal wires in a stream of helium gas.

It is obvious that the sensitivity of the detector depends upon the intensity of the radiation emitted from the discharge. The characteristics of the discharge have a close relationship to the construction of the discharge electrodes and the gap distance therebetween. As one example, the relationship between the discharge starting voltage and electrode gap distance in the case of a discharge in a stream of helium is indicated in FIG. 3. If such a discharge characteristic changes, the intensity of the radiation emitted from the discharge and, consequently, the intensity of radiation irradiating the interior of the sensing chamber will change, and, as a further consequence, the sensitivity of detection of the detector will also change. For this reason, irregularities in the discharge electrodes give rise to irregularities in the characteristics of the discharge itself, and, consequently, in the sensitivity of the detector. This problem has, heretofore, been a great obstacle hindering attempts to produce detectors as practical and marketable products.

In the detector according to the present invention shown in FIG. 5, however, the sensing chamber 14 and the discharge chamber 15 are fastened together by a screw connection. Therefore, the discharge chamber 15 can be readily disconnected from the sensing chamber 14, and adjustment of the gap and positions of the discharge electrodes 19 and 19a can be easily carried out. More specifically, by first operating the detector, measuring its characteristics, then repeatedly adjusting the discharge electrodes, it it possible to reduce, substantially, irregularities in the detector characteristics. It has been found that by this method irregularity in the sensitivity of the detector can be reduced to 30 percent or less. The provision of such an advantageous construction enabling easy disconnection of the discharge chamber is not only convenient at the time of initial adjustment but also affords easy adjustment of the electrode gap and, moreover, removal of contamination in the interior of the sensing chamber when, after a long period of use, electrode consumption necessitates such overhauling.

Although the embodiment of the invention shown in FIG. 5 is described as having a discharge chamber and a sensing chamber which can be mutually disconnected and reconnected, it will be obvious that the same effect can be obtained by providing a readily disconnectable discharge electrode assembly.

Thus, it should be understood, of course, that the foregoing disclosure relates to only a preferred embodiment and modification thereof the invention and that it is intended to cover all changes and modifications of the examples of the invention herein chosen for the purposes of the disclosure, which do not constitute departures from the spirit and scope of the invention as set forth in the appended claims.

I claim:
1. A photoionization detector for gases and vapors comprising, in combination: a structure defining a discharge chamber having a longitudinal axis; a first gas inlet means for introducing a discharge gas into said discharge chamber; a pair of mutually confronting needle-shaped electrodes disposed in said discharge chamber; a sensing chamber defined adjacent to said discharge chamber; a conductor part which is provided with an aperture of 0.5 to 3 mm. in diameter and coaxially connects said two chambers; a second gas inlet means for introducing a carrier gas into said sensing chamber; a pair of mutually confronting electrodes disposed in said sensing chamber; a common outlet for carrier and discharge gases in said sensing chamber; a first voltage source means for applying a potential between said needle-shaped electrodes to effect a discharge therebetween and the production of radiation rays and charged particles in said discharge chamber; a second voltage source means for applying a potential between said electrodes in said sensing chamber; and means for electrically grounding or applying a voltage to said conductor part, whereby charged particles, generated in said discharge chamber and having the same polarity as that of the voltage applied to said conductor part, and radiation rays, emanating from said discharge chamber, pass between said two chambers while charged particles, generated in said discharge chamber and having a polarity different from that of the voltage applied to said conductor part, are prevented from passing between said two chambers.

2. A photoionization detector, as claimed in claim 1, in which said conductor part is a metal disk provided with a central aperture of 0.5 to 3 mm. in diameter.

References Cited

UNITED STATES PATENTS

| | | | |
|---|---|---|---|
| 2,901,625 | 8/1959 | Friedman et al. | 250—43.5 |
| 2,950,387 | 8/1960 | Brubaker | 250—43.5 X |
| 2,959,677 | 11/1960 | Robinson et al. | 250—43.5 |
| 3,171,028 | 2/1965 | Lovelock | 250—43.5 X |

ROBERT SEGAL, Primary Examiner.

P. C. DEMEO, Assistant examiner.

U.S. Cl. X.R.

250—43.5; 313—100, 231; 324—33